Patented July 15, 1952

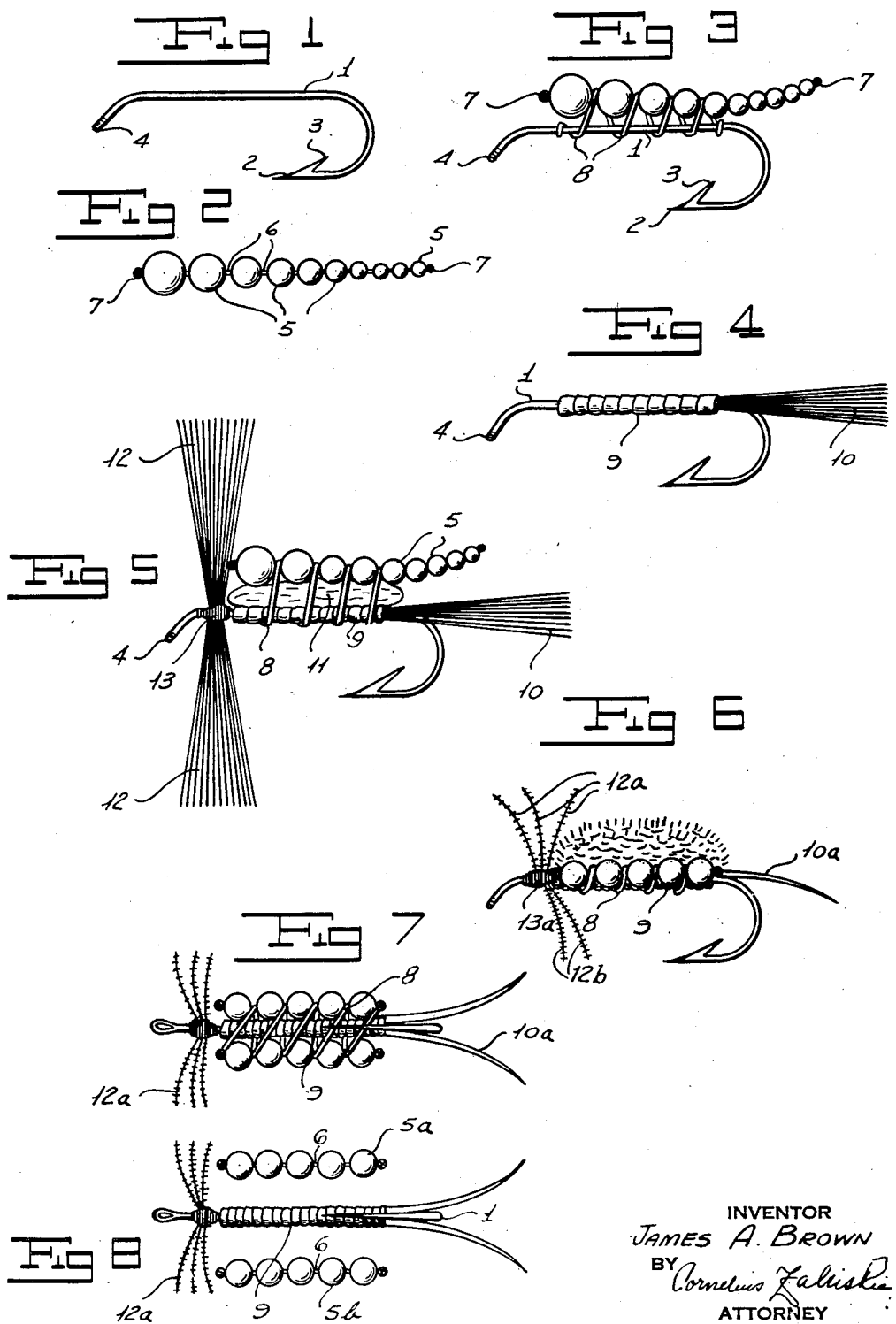

2,603,025

UNITED STATES PATENT OFFICE 2,603,025

FISH LURE

James A. Brown, White Plains, N. Y.

Application April 4, 1951, Serial No. 219,268

10 Claims. (Cl. 43—42.27)

This invention relates to fish lures and more particularly to lures of the fly or bug type wherein the body of the simulated fly or bug is mounted upon the shank of a barbed hook. The usual manner of making lures of this kind is to bind to the hook pieces or bits of lure materials, such as tinsel, wool, fur, feathers and the like, in such manner as to build up the simulated bug or fly body, generally with wings or tail formed from hackle, feather, hair or the like.

I have made very attractive lures by forming the bodies thereof through the use of strings of beads as hereinafter described. One or more of these strings of beads may be added to and form part of the usual lure body or one or more of them may constitute, per se, the entire body of the lure.

This use of beads should not be confused with the individual beads which have sometimes been strung directly on snells, leaders or hook shanks. According to this invention, in contradistinction, one or more independently strung strings of beads are positioned along one or more sides of the shank of the hook. These beads are first strung upon a suitable string or wire and thereafter bound to the hook either alone or together with supplementary portions of the body of the lure. These beads form no part of the hook or the snell or line attached to the hook, nor do they function as a connecting element between the hook, snell or line. I believe I am the first to ever use a string of beads in the manner described. Bugs and flies so made produce remarkable bug and fly simulation and they catch fish.

Features of the invention, other than those adverted to, will be apparent from the hereinafter detailed description and appended claims, when read in conjunction with the accompanying drawing.

The accompanying drawing illustrates different practical embodiments of the invention, but the constructions therein shown are to be understood as illustrative, only, and not as defining the limits of the invention.

Figure 1 shows a conventional fish hook.

Figure 2 shows a string of beads adapted, according to the present invention, to be associated with the hook.

Figure 3 shows the string of beads of Figure 2 associated with the hook of Figure 1, according to this invention.

Figure 4 shows the first step of making a fly body and hook combination such as shown in Figure 5.

Figure 5 shows the hook of Figure 1, the string of beads of Figure 2, the foundation of Figure 4, and a piece of chenille bound together on a hook with added hackle to form a finished fly.

Figure 6 is a side elevation of another form of bug.

Figure 7 is an underneath view of the bug of Figure 6.

Figure 8 shows the two strings of beads which enter into the structure of Figures 6 and 7 before they are attached to the remainder of the lure.

The hook shown in Figure 1 is of any conventional form having a shank 1, a point 2 and barb 3. It is shown as provided with an eye 4 for attachment to a leader or line, although the hook may be of the snell type wherein the snell is bound directly to the shank of the hook.

In Figure 2, there is shown a string of beads 5. These beads may be made of any organic plastic, glass, metal, stone or any other desired material and they may be transparent, translucent, white or colored, according to the wishes of the lure maker. They are perforated for the passage of the string on which they are strung and they may be all of the same size or graduated without departing from this invention. The opposite ends of the string are provided with enlargements 7 which may be in the form of knots, bends or otherwise, so as to permanently secure the beads on the string. In stringing these beads, however, they should not be strung too tightly for sufficient space should be permitted between certain of them to allow them to be wrapped or "ribbed" to the hook as shown in Figure 3. The "string" 6 may be of cotton, silk, wire, nylon, rayon, or any other desired material, thread or ribbon form.

Figure 3 shows one of the simplest forms of this invention. Here, the string of beads of Figure 2 is positioned along the back of the hook shank and wrapped or ribbed thereto by cord which may be in the form of thread or ribbon. This cord is passed about the shank and over the string 6, between successive beads, to bind the string of beads to the hook so that said string of beads forms the body of the lure. In practice, the string of beads may be left straight as shown in Figure 3 or it may be wrapped around the shank of the hook if desired.

A more ornate and complete simulation of a bug or fly is shown in Figure 5. In making this lure, the hook 1 is first wrapped with, for example, silver or gold ribbon to form the foundation 9 of the body, as shown in Figure 4, and, while this is being done, dyed bucktail 10 may be included in the wrapping to form the tail of the bug. After the foundation of the body has been made, as shown in Figure 4, a strip of chenille 11 is shown as positioned on top of the body and the string of beads of Figure 2 placed on top of the chenille. The chenille and the beads are then bound or ribbed to the foundation 9 by a cord 8 to secure all of these parts together. Instead of chenille, tinsel, fur, wool or any other suitable material may be used.

Wings for the lure may be simulated by the addition of dyed hackle 12 secured to the shank of the hook near the eye 4 by a thread wrapping 13. This thread wrapping may be lacquered and lacquer may also be used on other parts of the lure to render such parts waterproof or to secure them against inadvertent detachment. Instead of using hackle or bucktail for the wings and tail of the lure, quill, fur or any other conventional material may be employed for this purpose.

In Figures 3 and 5, the lure is shown as having a single string of beads. In accordance with this invention, however, more than one string may be used and in Figures 6-8, a lure with two strings is illustrated. In this construction, the foundation is first produced, as shown in Figure 4, although in Figure 6 small feathers 10a are used for the tail. Two strings of beads 5a and 5b. of about the same length as the body, are placed on opposite sides of the foundation 9, while a small bit of fur or chenille is placed on top of the foundation. The whole is then bound or ribbed together by a cord or tinsel 8.

If desired, the string of beads 5a and 5b may be continuous with the string, on which they are strung, extending around the rear or fore part of the foundation as desired without departing from this invention. The lure of Figure 8 is completed by wrapping simulated feet or feelers, e. g., as feathers 12a for feelers and 12b for feet, by a thread wrapping 13a and then lacquering the wrapping in place.

In carrying out the present invention, the parts which make up the lure may be of widely different colors to produce correspondingly wide variation in simulated bugs or flies as will be apparent to those skilled in this art. The present invention is, moreover, not limited in its practical application to the making of the specific lures shown in the accompanying drawings for a wide variety of such lures may be made without departing from this invention, the scope of which is to be understood as fully commensurate with the appended claims.

Having thus fully described the invention, what I claim as new and desire to secure by Letters Patent is:

1. A fish lure comprising: a barbed hook having a shank, and a succession of beads strung upon a string and collectively arranged alongside of and longitudinally of the shank of the hook and secured to the latter.

2. A fish lure comprising: a barbed hook having a shank, and a succession of beads strung upon a string and collectively arranged alongside of and longitudinally of the shank of the hook and secured to the latter by a cord wrapped around the string and the shank.

3. A fish lure comprising: a barbed hook having a shank, and different lure materials arranged about the shank and permanently secured thereto, said lure materials including at least one string of beads.

4. A fish lure comprising: a barbed hook having a shank, and different lure materials including at least one string of beads arranged about the shank and bound to the shank by a cord wrapped around the string of beads and the shank.

5. A fish lure comprising: a barbed hook having a shank, a lure body including a string of beads ribbed to the shank, a simulated tail independently secured to the shank at one end of the body, and simulated wings independently secured to the shank at the other end of the body.

6. A fish lure comprising: a barbed hook having a shank, a lure body including a string of beads ribbed to the shank, a simulated tail independently secured to the shank at one end of the body, and simulated feet independently secured to the shank at the other end of the body.

7. A fish lure comprising: a barbed hook having a shank, a lure body including a string of beads ribbed to the shank, a simulated tail independently secured to the shank at one end of the body, and simulated feelers independently secured to the shank at the other end of the body.

8. A fish lure comprising: a barbed hook having a shank, a foundation wrapped about the shank and binding a simulated tail at one end thereof, body material assembled on the foundation and including a string of beads, and cord binding the body material including the string of beads to the foundation.

9. A fish lure comprising: a shank provided at one end with a hook, a foundation wrapped about the shank, relatively soft body material positioned on said foundation, a string of beads resting on the body material on the side of the shank opposite the hook, and cord wrapped about the shank, foundation, soft body material and strings of beads to secure them permanently to the shank.

10. A fish lure comprising: a shank provided at one end with a hook, a foundation wrapped about the shank, relatively soft body material positioned on said foundation, and strings of beads resting on the body material at opposite sides of the shank, and cord wrapped about the body material and beads to permanently bind them to the shank.

JAMES A. BROWN.

REFERENCES CITED

The following references are of record in the file of this patent:

UNITED STATES PATENTS

| Number | Name | Date |
| --- | --- | --- |
| 1,026,131 | Taylor | May 14, 1912 |
| 2,093,585 | Woodhead et al. | Sept. 21, 1937 |
| 2,551,221 | Pray | May 1, 1951 |